United States Patent

Park et al.

[11] Patent Number: 6,072,649
[45] Date of Patent: Jun. 6, 2000

[54] CONSTANT DENSITY RECORDING METHOD AND SYSTEM FOR HEADLESS FORMAT IN HARD DISC DRIVER

[75] Inventors: Jung-Il Park; Yong-Woo Park, both of Suwon, Rep. of Korea

[73] Assignee: Samsung Electronics Co., Ltd., Kyungki-do, Rep. of Korea

[21] Appl. No.: 08/841,667

[22] Filed: Apr. 30, 1997

[30] Foreign Application Priority Data

May 22, 1996 [KR] Rep. of Korea ................. 96-17527

[51] Int. Cl.[7] ...................................................... G11B 5/09
[52] U.S. Cl. ................................. 360/50; 360/48; 360/49; 360/53; 360/75; 360/78.07
[58] Field of Search ............................. 360/48, 50, 49, 360/53, 75, 78.07; 395/184.01; 711/154

[56] References Cited

U.S. PATENT DOCUMENTS 5,715,106  2/1998  Kool et al. .................................. 360/48

FOREIGN PATENT DOCUMENTS 20 631 277  12/1994  European Pat. Off. ......... G11B 5/596
20 660 324   6/1995  European Pat. Off. ......... G11B 20/12
 2 296 598   7/1996  United Kingdom ............ G11B 20/12
WO95/24035   9/1995  WIPO ............................ G11B 20/12

*Primary Examiner*—Nabil Hindi
*Assistant Examiner*—Joseph M Vann
*Attorney, Agent, or Firm*—Sughrue, Mion, Zinn, Macpeak & Seas, PLLC

[57] ABSTRACT

A method of and a system for efficiently using split information stored in an unnecessary data sector, thereby reducing unnecessary data. The system includes first registers respectively adapted to store MCDR values in response to a write control signal generated from a central processing unit; second registers respectively coupled to the first registers, each second register down-loading the MCDR value from the corresponding first register in response to a servo sector interrupt application signal inverted by an inverter, thereby generating signals indicative of an internal flag, an internal CDR value and a split sector number; a multiplexer adapted to multiplex the internal flag signals from the second registers, thereby generating a flag signal; a counter adapted to count the servo sector interrupt application signal, thereby generating a current sector number signal indicative of the number of a sector being currently accessed; a synthesizer adapted to generate a CDR signal based on the split sector number signal from each second register; and a comparator for comparing the split sector number signal from each second register with the current sector number signal from the counter, thereby generating a sector good signal.

5 Claims, 2 Drawing Sheets

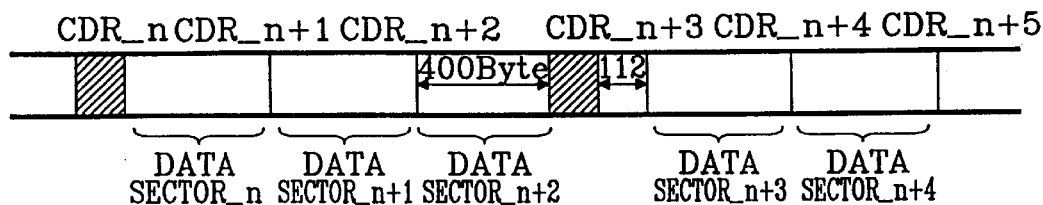
Fig. 1
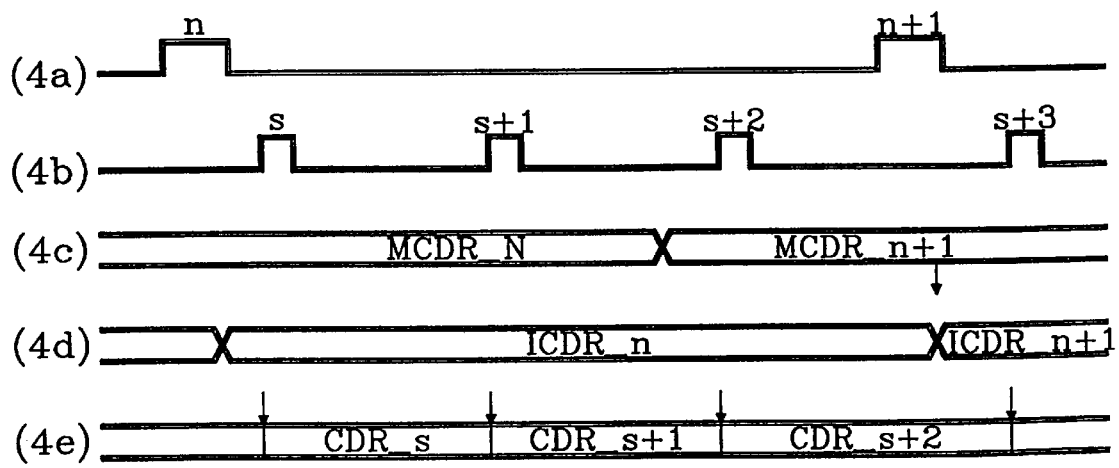
Fig. 2
Fig. 4

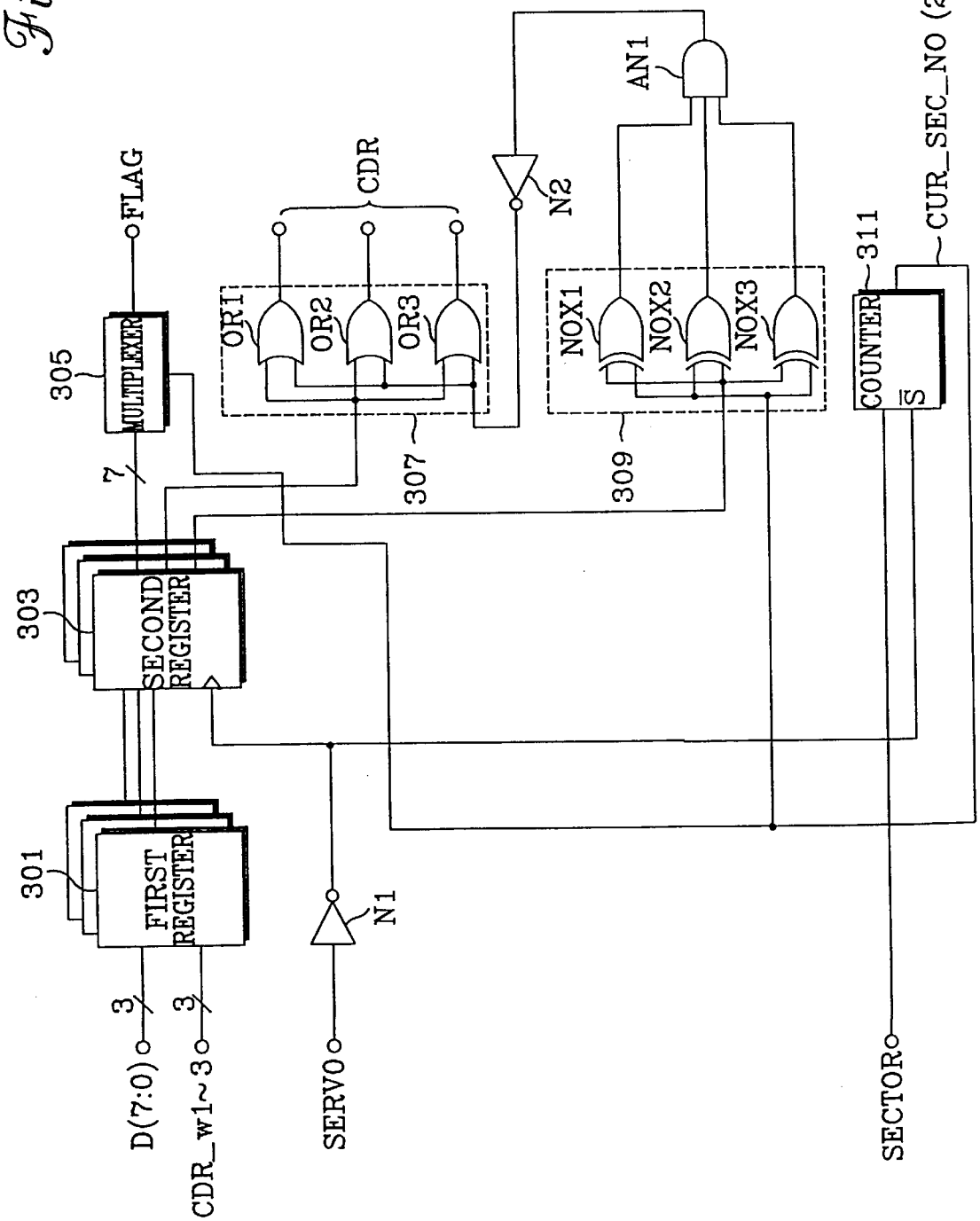

CONSTANT DENSITY RECORDING METHOD AND SYSTEM FOR HEADLESS FORMAT IN HARD DISC DRIVER

BACKGROUND OF THE INVENTION

1. Field of the Invention

The present invention relates to a constant density recording (CDR) method used in hard disc drivers, and more particularly to a method of and a system for producing information for a CDR upon formatting a hard disc drive in a headerless manner by modifying ID fields and data fields.

2. Description of the Related Art

For hard disk drivers (HDD's), a headerless formatting method is known. The headless formatting method is a data recording method wherein data is recorded on an HDD using only data fields. In other words, no ID field is used in accordance with the headerless formatting method. In the case of HDD's utilizing a headerless format, CDR values should be used for a CDR. An example of such a headless formatting method is disclosed in Korean Patent Application No. 94-35785. In a conventinoal method, an ID field is used along with every data field upon reading and writing data. Positional information about data to be read or written is generated from each ID field. Such an ID field is used as an overhead for storing the positional information. They are not used as information for storing actual information for user data. This format is a headerless format. ID field signals are generated from a control unit other than that included in the HDD. For example, information such as cylinder numbers, head numbers and sector numbers are generated from the gray code unit for servo fields.

It is most efficient to obtain an increase in capacity of the disk of an HDD by having the disk store only data. In this case, however, it is additionally necessary to load positional information and CDR values. In order to satisfy such a requirement, a method is mainly used wherein a desired portion of an external buffer RAM is allocated in such a manner that a CDR value for every track is stored, as shown in FIG. 1. In accordance with this method, CDR values are stored in the buffer RAM. Subsequently, the CDR values and positional information are automatically loaded on corresponding sectors, respectively.

Loading of CDR values using the buffer RAM have been simply achieved using a method in which CDR values (for respective sectors of every track) loaded on a previous ID field are positionally shifted to the buffer RAM, thereby achieving an automatic loading thereof. In accordance with conventional methods, however, a split is generated in each servo-sector. Although data sectors, such as "CDRn" in FIG. 1, involving no split are inscribed with actual bytes of data, a data sector, such as "CDRn+2" in FIG. 1, involving a split can not be inscribed with actual bytes of data, as indicated by the shaded portions in FIG. 1. As a result, there is a waste of memory areas.

On the other hand, loading of CDR values from the buffer RAM is automatically carried out. There are five kinds of sources for accessing the buffer, namely, those for refresh, error correction, disk, host and main processor unit (MPU). In order to load all the CDR values, an additional buffer RAM should be used. Furthermore, the loading of CDR values should be carried out with a priority over the processing of other data values. This results in a burden to the buffer managing unit. Meanwhile, the HDD performs an error correction. As the error correction ability of the HDD increases, the quantity of data to be accessed per one sector increases correspondingly. As a result, the burden of the buffer managing unit increases even more.

SUMMARY OF THE INVENTION

Therefore, an object of the invention is to provide a method of and a system for efficiently using split information stored in an unnecessary data sector, thereby reducing unnecessary data.

In accordance with the present invention, to achieve the above object, a servo routine is executed in response to an interrupt from a current servo sector. Thereafter, a CDR producing value is down-loaded for the next servo sector. Using this value, a CDR value for each desired data sector of the next servo sector is loaded. Accordingly, it is possible to load CDR values for a headerless format without interfering with the buffer management.

The present invention also provides a circuit for generating CDR (constant density recording) values for a headerless format in a hard disk driver equipped with a central processing unit comprising: first registers respectively adapted to store MCDR values in response to a write control signal generated from a central processing unit and received at a write control signal stage; second registers respectively coupled to the first registers, each second register downloading the MCDR value from the corresponding first register in response to a servo sector interrupt application signal which is applied to a servo control stage and inverted by an inverter, thereby generating signals indicative of an internal flag, an internal CDR value and a split sector number; a multiplexer adapted to multiplex the internal flag signals from the second registers, thereby generating a flag signal; a counter adapted to count the servo sector interrupt application signal applied to the servo control stage, thereby generating a current sector number signal indicative of the number of a sector being currently accessed; a synthesizer adapted to generate a CDR signal based on the split sector number signal from each second register; and sector good signal generating means for comparing the split sector number signal from each second register with the current sector number signal from the counter, thereby generating a sector good signal.

BRIEF DESCRIPTION OF THE DRAWINGS

Other objects and aspects of the invention will become apparent from the following description of embodiments with reference to the accompanying drawings in which:

FIG. 1 is a diagram illustrating a conventional data format of CDR values;

FIG. 2 is a diagram illustrating a data format for the generation of CDR values for one servo sector in a HDD in accordance with the present invention;

FIG. 3 is a block diagram illustrating a circuit for generating CDR information to be used for a headless format according to the present invention; and FIG. 4 is a timing diagram of signals generated in the operation of the circuit shown in FIG. 3.

DETAILED DESCRIPTION OF THE PREFERRED EMBODIMENTS

FIG. 2 is a diagram illustrating a data format for the generation of CDR values for one servo sector in a HDD in accordance with the present invention.

The HDD has servo sectors each provided with a maximum of 8 flags. The HDD also has split sectors each bearing an intrinsic number. Each split sector is defied by a desired number of bytes.

Referring to FIG. 3, a circuit for generating CDR information to be used for a headerless format according to the present invention is illustrated.

As shown in FIG. 3, the circuit includes first registers 301 which serve to store MCDR values, which may be data MCDR CONTROL-1, 2 and 3 in FIG. 2, in response to a write control signal generated from a central processing unit (not shown) and received at a write control signal stage CDR-WR.

Second registers 303 are coupled to the first registers 301, respectively. Each second register 303 down-loads an output from the corresponding first register 301, namely, an MCDR value, in response to a servo sector interrupt application signal which is applied to a servo control stage SERVO and inverted by an inverter N1. In other words, the MCDR value output from each first register 301 is down-loaded in the corresponding second register 303 at a negative edge of the servo sector interrupt application signal from the servo control stage SERVO because the signal from the servo control stage SERVO is inverted by the inverter N1.

The second registers 303 have a double buffering function so that the central processing unit can control them freely. The down-load time of the central processing unit is determined so that writing of data can be carried out after the receiving of the current servo interrupt, but before the generation of a negative edge of the next servo interrupt. After shifting the received data in accordance with the output from the inverter N1, each second register 303 outputs an internal flag IFLAG (7:0), a split sector number SPLIT-SECTOR-NO (2:0), and an internal CDR value ICDR (11:0). The internal flag IFLAG (7:0) is applied to a multiplexer 305 whereas the split sector number SPLIT-SECTOR-NO (2:0) is applied to a comparator 309. The comparator 309 includes exclusive NOR gates NOX1 to NOX3. On the other hand, the internal CDR value ICDR (11:0) is applied to a synthesizer 307. The synthesizer 307 is coupled to the output of the comparator via an AND gate AN1 and an inverter N2. The synthesizer 307 includes OR gates OR1 to OR3.

Meanwhile, a counter 311 is also coupled to the inverter N1. The counter 311 is an asynchronous counter which is preset when the signal received at the servo stage SERVO is at a high level, namely, when the output from the inverter N1 is at a low level. After being preset, the counter 311 counts a signal received at a sector terminal thereof. The counted value of the counter 311 is changed from "00" in response to a positive edge of the signal received at the sector terminal of the counter 311. As a result, the counter 311 generates a current sector number CUR-SEC-NO (2:0) which is, in turn, applied as a select control signal to the multiplexer 305 and as a reference value to the comparator 309. In response to the output from the counter 311, the multiplexer 305 generates a flag signal for a selected sector based on the internal flag IFLAG (7:0) received from each second register 303. On the other hand, the comparator 309 compares the split sector number SPLIT-SECTOR-NO (2:0) received from the second register 303 with the output from the counter 311. When the split sector number SPLIT-SECTOR-NO (2:0) is identical to the output from the counter 311, the comparator 309 generates a signal having a level of "1". This state means that the input at the sector stage SECTOR is identical to the input at the split sector number stage SPLIT-SECTOR-NO. In this state, the AND gate AN1 outputs a signal having a high level. That is, the AND gate AN1 generates a sector good signal GOOD-SEC. This signal is inverted to a low level while passing through the inverter N2. The inverted signal is then applied to the OR gates OR1 to OR3 of the synthesizer 307 which also receive the internal CDR value ICDR (11:0).

The OR gates OR1 to OR3 of the synthesizer 307 generate CDR values based on the received signals, respectively. That is, a flag and a CDR value associated with the current sector are generated based on the sector good signal GOOD-SEC and the internal CDR value ICDR (11:0). Using these values, a CDR is processed.

Since a central processor unit directly down-loads CDR values, it is possible to reduce the management load of buffers. Accordingly, it is possible to reduce the number of buffers to be accessed for one sector even though the error correction ability increases continuously. Therefore, the efficiency of using buffers is improved. It is also possible to simplify the data format associated with the flag and CDR value for every data sector. This results in a reduction in memory area. In accordance with an increase in HDD capacity, existing HDD's can process 3 or 4 data sectors for one servo sector. In accordance with the present invention, however, it is possible to process up to 8 data sectors. Accordingly, the above-mentioned effect can be greatly improved. For example, in conventional cases, the number of CDR bytes needed for 8 data sectors is 16 bytes (2 bytes*8=16 bytes), while in the present invention the number of CDR bytes needed for 8 data sectors is 3.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A circuit for generating CDR (constant density recording) values for a headerless format in a hard disk drive equipped with a central processing unit, the circuit comprising:

first registers respectively adapted to store MCDR values (MPU generated CDR values), internal flags, indicating validity of data sectors existing between servo sectors, and a split sector number in response to a write control signal generated from a central processing unit and received at a write control signal stage;

second registers respectively coupled to said first registers, each second register down-loading one of said MCDR values, one of said internal flags and said split sector number from said corresponding first register in response to a servo sector interrupt application signal which is applied to a servo control stage and inverted by an inverter, and generating signals indicative of one of said internal flags, an internal CDR value, corresponding to said MCDR value, and said split sector number;

a multiplexer for multiplexing said internal flag signals from said second registers, and outputting a flag signal, indicating validity of data of a current data sector;

a counter for counting said servo sector interrupt application signal applied to said servo control stage, thereby generating a current sector number signal indicative of the number of a sector being currently accessed;

a sector good signal generating unit for comparing said split sector number signal from each of said second registers with said current sector number signal from said counter, and generating a sector good signal, when said split sector number signal has the same value as said current sector number signal; and a synthesizer for generating a CDR signal based on said split sector number signal from one of said second registers and based on the sector good signal.

2. The circuit in accordance with claim 1, wherein said synthesizer comprises OR gates each adapted to receive the internal CDR value from each of said second registers and an inverted output signal from said sector good signal generating unit.

3. The circuit in accordance with claim 1, wherein said sector good signal generating unit comprises exclusive NOR gates each of which receives said current sector number signal from said counter and said split sector number signal from each of said second registers.

4. The circuit in accordance with claim 1, wherein said servo sector interrupt application signal applied to said servo control stage and inverted by said inverter is applied to each of said second registers as a clock signal and to said counter as an enable signal.

5. A method for generating CDR values for a headless format in a hard disk drive equipped with a central processing unit, comprising the steps of:

executing a servo routine in response to an interrupt from a current servo sector of said hard disk;

downloading a CDR producing value for a next servo sector;

producing a CDR value for each data sector needed for said next servo sector by use of said CDR producing value; and comparing a split sector number signal, generated in response to a servo interrupt application signal, with a current sector number, and generating a sector good signal when said split sector number signal has the same value as said current sector number signal.

* * * * *